United States Patent
Hirayama

(10) Patent No.: US 6,836,566 B1
(45) Date of Patent: Dec. 28, 2004

(54) SYSTEM FOR POINTING

(75) Inventor: Yuki Hirayama, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/439,157

(22) Filed: Nov. 12, 1999

(30) Foreign Application Priority Data

Jan. 25, 1999 (JP) .......................................... 11-015761

(51) Int. Cl.[7] ............................. G06K 9/62; G09G 5/08; G09G 5/00
(52) U.S. Cl. ........................ 382/209; 345/157; 345/856
(58) Field of Search ................. 382/209; 345/157–167, 345/856–863, 179

(56) References Cited

U.S. PATENT DOCUMENTS

| | | | | |
|---|---|---|---|---|
| 5,317,680 A | * | 5/1994 | Ditter, Jr. ..................... | 345/630 |
| 5,448,688 A | * | 9/1995 | Hemingway ................. | 345/441 |
| 5,640,243 A | * | 6/1997 | Koitabashi et al. .......... | 356/401 |
| 5,737,553 A | * | 4/1998 | Bartok ......................... | 345/764 |
| 5,808,601 A | * | 9/1998 | Leah et al. ................... | 345/856 |
| 5,844,557 A | * | 12/1998 | Shively, II ................... | 345/846 |
| 5,917,486 A | * | 6/1999 | Rylander ..................... | 345/764 |
| 5,933,135 A | * | 8/1999 | Martin ......................... | 345/179 |
| 6,040,824 A | * | 3/2000 | Maekawa et al. ............ | 345/173 |
| 6,259,436 B1 | * | 7/2001 | Moon et al. .................. | 345/173 |

FOREIGN PATENT DOCUMENTS

GB  2202104 A  *  9/1988  ............ G01C/3/18

* cited by examiner

*Primary Examiner*—Leo Boudreau
*Assistant Examiner*—Tom Y Lu
(74) *Attorney, Agent, or Firm*—Gregory M. Doudnikoff

(57) ABSTRACT

A method and a system in a computing environment which are capable of accurately pointing to any desired position in displayed images of various shapes. Pointing to a desired position on a displayed image is performed by using position correction information (position information of a hot spot) and an associated image as a template. A hot spot is an arbitrary point specified in advance in a template image, and a hot spot position in the template image is used as correction information of a pointing position. First, an image in the vicinity of a display coordinate obtained from a pointing device is compared with at least one template image. A closest matching template image and its position on an image are determined, and a final pointing position is calculated from the position on the image and position correction information (position information of a hot spot) associated with the template image.

4 Claims, 4 Drawing Sheets

SYSTEM FOR POINTING

BACKGROUND OF THE INVENTION

1. Field of the Invention

The present invention relates to a pointing system in a data processing environment. More particularly, the present invention relates to a pointing system which corrects position information of a hot spot included in a template to a coordinate system of an image and repositions and outputs it in a click position.

2. Description of the Related Art

In recent years, as mobile devices such as the personal assistant (PA) have been developed, cases have been significantly increasing in which a small device is used for receiving a fax, for accessing image data on the Internet, etc. Correspondingly, the size of the display associated with such devices is quite small. While, in the case of the PA, a pen device is frequently used for pointing to a location on its display, accurate pointing is very difficult due to the small size of the display area. Usually, to point to and select an arbitrary point of displayed image data, the point is directly clicked with a pointing device such as a mouse, or else an image is enlarged prior to point selection (being clicked) to improve accuracy. In the case of directly clicking it, however, it is difficult to accurately specify a target point and select (click) it due to a difference in resolution between a screen and an image or poor visibility of the screen itself.

On the other hand, while accuracy may be improved by enlarging the image, the operation becomes complicated, considering the trouble of enlarging the image and possible necessity of scrolling the enlarged image if it becomes too large for complete display. Such problems are especially serious for a small mobile device such as a PA.

For instance, it is assumed that, in the case of a form image or the like, an operator needs to specify a starting point and an endpoint of a ruled line by clicking a mouse. In that case, it is very difficult to accurately specify with a mouse a starting point and an endpoint of a ruled line. Though it is possible to do so by displaying an enlarged image, unnecessary operations will increase, such as enlarging, reducing and scrolling.

Moreover, the problem of displaying a reduced image is not limited to a small device such as a PA, but also occurs for other display devices and the like which are now generally used. Resolution of a display of a desktop computer, a notebook computer and the like which are now generally used is 1024 dots wide×768 dots long, 1280 dots wide×1024 dots long and the like. In many cases, however, the sizes of images actually used for business are much larger than these sizes.

For instance, if an image is created from an A4-size sheet, it becomes approximately 2280 dots long×1650 dots wide for fax quality (200 dpi length and width), and approximately 3420 dots long×2470 dots wide for 300 dpi, which is considered a minimum resolution requirement in the case that optical character recognition (OCR) is a prerequisite. In addition, in the case of 400 dpi considered as a recommended condition for Japanese OCR and the like, it becomes approximately 4560 dots long×3300 dots wide. If these images are to be displayed on the above-mentioned displays, to display an image of 400 dpi on a display of 1024×768 dots, the length and width must be reduced to one sixth or so respectively so as to display the entire image at once on the display. Even for fax quality image, the length and width must be reduced to one third or so respectively. The necessary additional operations, such as enlarging, reducing and scrolling of an image, place a large burden on the user, and require time.

With regard to such a problem, for instance, Japanese Unexamined patent Publication No. Hei 6-28100 describes a method wherein a coordinate of a designated point specified by a pointing device is corrected with correction data so that the corrected coordinate position becomes the designated point specified by the pointing device. Also, Japanese Unexamined patent Publication No. Hei 3-18965 describes a method for acquiring by calculation a point of intersection of line segments in the vicinity of a specified point so as to correct the position. However, these background techniques describe methods for coping with specific corrections for specific business applications, and thus only pointing to an existing point such as intersection of line segments is possible. Such background techniques do not provide a method for accurately pointing to arbitrary positions of various shapes. In addition, they are not capable of more flexible correction to identify a coordinate position. For instance, they are not capable of correcting to a point with no line segment instead of a point of intersection of line segments. Furthermore, they do not provide a method for dynamically registering/changing position correction information during a pointing operation.

SUMMARY OF THE INVENTION

Therefore, an object of the present invention is to provide a method and a system for pointing which are not sensitive to a difference in resolution between a screen and an image.

Another object is to provide a method and a system for pointing which are capable of easily pointing to any desired position in an image even in an environment where a display device does not have the ability to display the entire image.

A further object is to provide a method and a system for pointing which are capable of pointing to any desired position of an image without enlarging an image or scrolling.

A still further object is to provide a method and a system for pointing which are capable of accurately pointing to any desired position of images having irregular shapes.

A still further object is to provide a method and a system for pointing which are capable of more flexible correction to identify a coordinate position.

A still further object is to provide a method and a system for pointing which are capable of correcting to a point not associated with a line segment.

A still further object is to provide a method and a system for pointing which are capable of dynamically registering/changing position correction information during a pointing operation.

To achieve the above-mentioned objects, pointing is performed by using position correction information (position information of a hot spot) and an associated image as a template. A hot spot is an arbitrary point specified in advance in a template image, and a hot spot position in a template is used as correction information of a pointing position. It is organized so that, first, an image in the vicinity of a coordinate obtained from a pointing device is compared with an image of a template, a closest matching template and its position on an image are located, and a final pointing position is calculated from the position on the image and position correction information (position information of a hot spot) associated with the template.

Since it is organized in this way, easy pointing is possible even in the cases that a large image is reduced for display or a display device itself, such as a PDA, is too small for an accurate click. In addition, as it is possible to accurately point to arbitrary positions of images having irregular shapes, more flexible correction can be performed to identify a coordinate position. For instance, it is possible to correct to a point without the need for a line segment or to select a hot spot position freely, such as upper right or upper left portion of an image, in addition to the vicinity of the center of a template. Furthermore, a template (a template image and position correction information) can be dynamically generated/changed during a pointing operation.

DESCRIPTION OF THE PREFERRED EMBODIMENT

Figure 1:
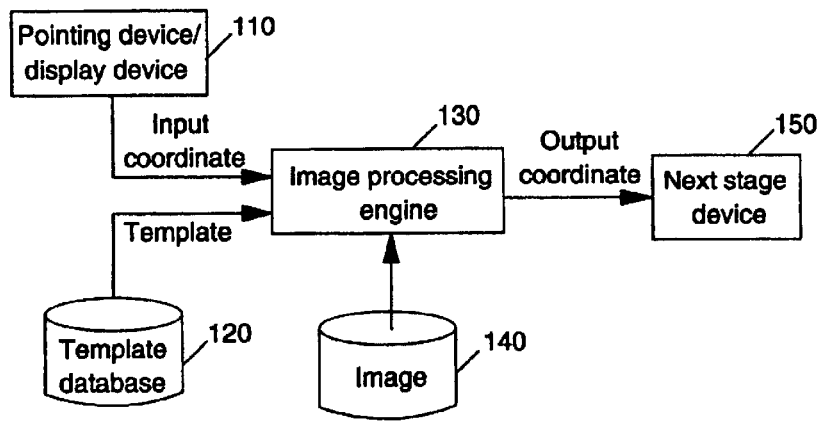
FIG. 1 illustrates an overview of the present invention.

FIG. 1 shows an overview of the present invention. Block 110 comprises a pointing device and a display device. A pointing device, such as a mouse, points to a position displayed on a display device, and a coordinate is entered to an image processing engine 130 of the present invention. The image processing engine 130, using an input coordinate from the pointing device, a template and an original image 140 as input, outputs a proper pointing coordinate to a next stage device 150. Moreover, a template may be read from a template database 120, which stores multiple templates, or a template stored in memory in advance may be used. Also, an original image may be an image already stored in an image database or an image output from an another image reader (a scanner), a fax or the like. The original image 140 is image data which is neither reduced nor enlarged. While it may be displayed after reduction on a display, the image data to be accessed here is image data before it is reduced. Normally, the next stage device 150 is often an application or the like utilizing a pointing coordinate. An example of this is an application for writing a line segment utilizing a coordinate clicked with a mouse or the like. A template is information used by the image processing engine 130 to analyze the original image 140. This template has no unique shape and each template differs. It is described in detail later. The template database 120 is a database for storing templates. An operator selects from this database a template to be used (may be more than one) and use it. It is always possible to add or delete template information as required to or from this template database 120. For instance, it is possible to cut part of the image data and add it as a template so that the template is used for another part of the image. This is called dynamic generation of a template. It is very effective in the case that there exist a large number of identical shapes on an image.

Figure 2:
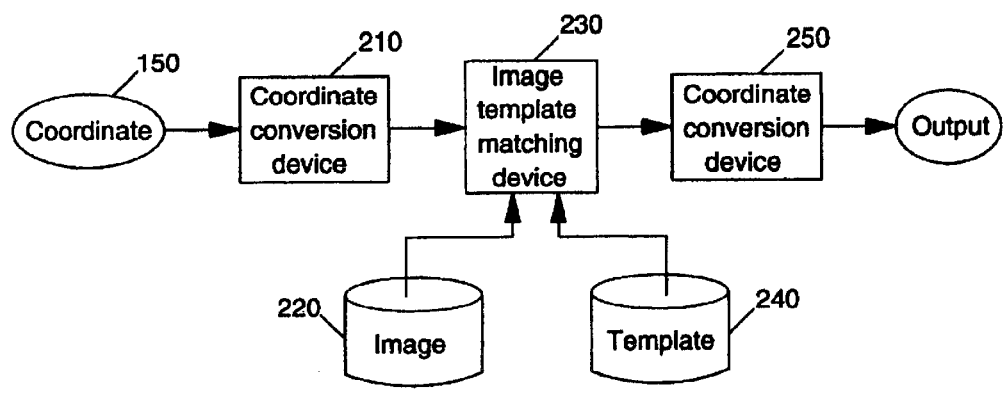
FIG. 2 is a configuration diagram of an image processing engine 130 of the present invention.

Next, FIG. 2 shows the configuration of the image processing engine 130 of the present invention. A coordinate conversion device 210 has a role of correcting coordinate information (x, y) sent from the pointing device/display device 110 to a coordinate system of an original image 220 based on information such as enlarging, reducing and scrolling. This becomes input coordinate information ($x_{in}$, $y_{in}$) for an image template matching device 230. The image template matching device 230 is a device for correcting coordinates to be input ($X_{in}$, $Y_{in}$) by referring to the original image 220 and a template 240 so as to output them ($X_{out}$, $y_{out}$). The image template matching device 230 is a central component of the present invention, and its details are described later. A coordinate correction device 250 is a device for returning the coordinates ($X_{out}$, $Y_{out}$) output as a result of processing by the image processing engine 130 to a coordinate system of an image displayed on a display device. It converts the coordinates ($X_{out}$, $Y_{out}$) which are corrected to a coordinate system of an original image, to a coordinate system of a display device.

Next, a template and a process using it are described. A template has the following information:

(1) a method for matching;

(2) data necessary for matching (a template image); and (3) hot spot information (position correction information).

The image template matching device 230 processes the original image 220 based on such template information. This process is described as follows.

Figure 3:
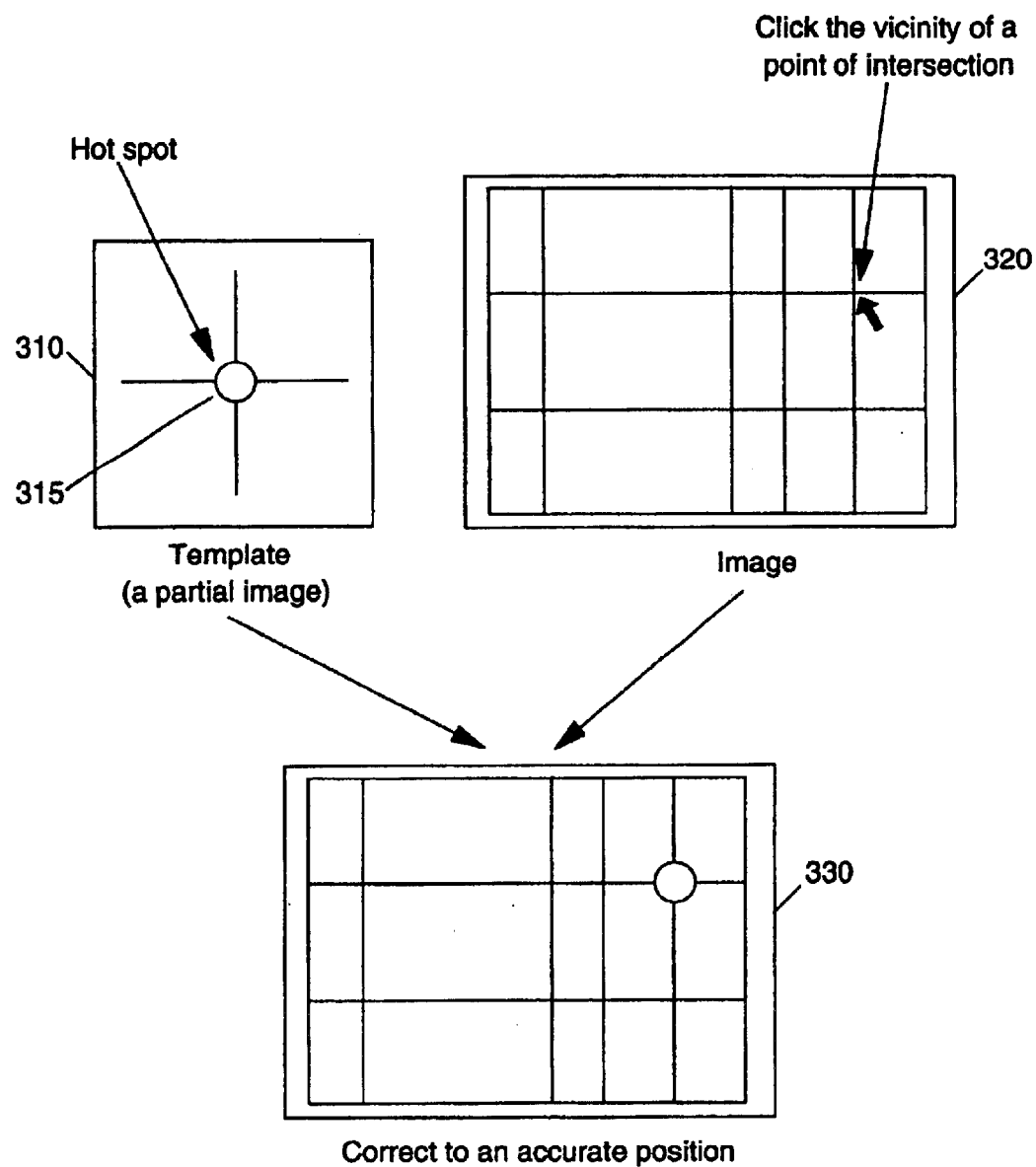
FIG. 3 is a drawing showing an overview of a process for image matching.

A method for matching of the present invention is an image matching method. FIG. 3 shows an overview of a process for image matching. As necessary data, a partial image 310 (a template image) as in FIG. 3 is prepared. A portion of the partial image 310 indicated by a circle 315 in FIG. 3 is a location of a hot spot. First, the image processing engine 130 searches for a portion of the overall image with the same pattern as the partial image 310 of FIG. 3 in a certain range around the input coordinates ($X_{in}$, $Y_{in}$) (the range is decided by an adequate threshold). The method of searching is, for instance, fitting the partial image 310 of FIG. 3 on an original image 320 by shifting it by one dot, taking a difference pixel by pixel and acquiring where the total of their absolute values is minimum. Thus, a position with the same pattern as the partial image 310 (in reality, a closest pattern) is located in the vicinity of the input coordinates ($X_{in}$, $Y_{in}$). Next, the image processing engine 130 calculates a position of an original coordinate system corresponding to the hot spot 315 of the partial image 310. The image processing engine 130 then outputs the calculated position as output coordinates ($X_{out}$, $Y_{out}$).

There are other methods for matching, such as "line segment extraction" and "color gap detection." It is also possible to perform matching by combining these methods for matching with the present invention. Other methods for matching are described as follows. In the case of "line segment extraction," it is information such as "a point of intersection" as hot spot information. Line segment extraction from an image which is often performed in OCR and the like is implemented for a relatively wide range around the input coordinates ($X_{in}$, $Y_{in}$). In the case that an image is not a binary image, however, it is necessary to implement in advance binarization as preprocessing. After a line segment is detected, it is checked whether these points of intersection are within the certain range of the input coordinates ($X_{in}$, $Y_{in}$). The coordinates within the range and closest to the input coordinates ($X_{in}$, $Y_{in}$) are output as the output coordinates ($X_{out}$, $Y_{out}$).

In the case of "color gap detection," it is "a place with the largest gap" as hot spot information. For a horizontal line segment of a certain length through the input coordinates ($X_{in}$, $Y_{in}$), a place with the largest gap between neighboring pixels on a line segment is selected. An expression for a color gap, for instance, may be Gap $g=(r1-r2)^2+(g1-g2)^2+(b1-b2)^2$ if the values of two neighboring sets of RGB three colors are (r1, g1, b1), (r2, g2, b2) respectively. And the point of the largest gap with a next point is output as the output coordinates ($X_{out}$, $Y_{out}$). This is considered available for clicking a border in image data such as photograph.

For a single pointing operation by an operator, the image processing engine 130 does not necessarily implement a process as above only to one template. In some cases, it may prepare several templates and examine which of them is most appropriate. The template database 120 manages templates for this purpose. It is possible to select in advance several templates to be used depending on a type of an image (or cut a part of an image and register/select it as a template on the spot), and fit those selected templates one by one during a pointing operation so as to locate an optimal case. In addition, it is no problem at all if image processing, line segment detection and the like are mixed in these selected templates.

Figure 4:
FIG. 4 is an example of specification of a hot spot which allows pointing operations unique to the present invention.
Figure 5:
FIG. 5 is another example of specification of a hot spot which allows pointing operations unique to the present invention.
Figure 6:
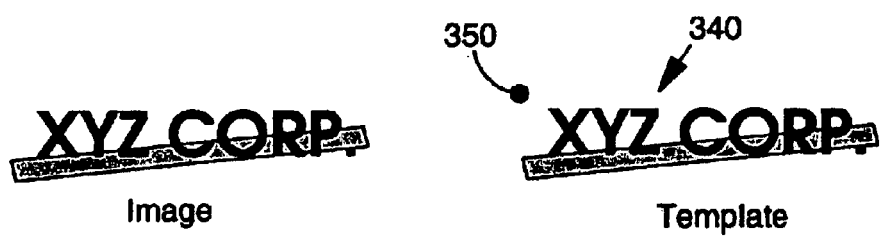
FIG. 6 is another example of specification of a hot spot which allows pointing operations unique to the present invention.

FIGS. 4, 5 and 6 show examples of specification of a hot spot which allows pointing operations unique to the present invention. In each of these drawing figures, the left element is an original image and the right element is a template image. First, if a template is specified as a point of intersection of line segments in FIG. 4, it is possible to point the point of intersection of line segments even if the point of intersection in an original image is faded and illegible. In FIG. 5, a hot spot is specified at the center of a screw so that the center of the screw, which does not have line segment information existing therewith, can still be pointed to. For instance, if a large number of specific shapes appear in a certain image (such as when a large number of screw symbols are included on a design drawing) which are selected and pointed by an operator, the operator first cuts a shape as a part of an image (a screw symbol). Then a hot spot in the image (in this example, the center of the screw) is specified. Then such information is registered in a template database. If the operator clicks around a location on an image where this shape is drawn, a click coordinate is corrected as if the exact hot spot location (the center of a screw in FIG. 5) was clicked, due to matching with a template. This in an example of the application of dynamic generation of a template of the present invention. In addition, as illustrated in FIG. 6, it is possible to accurately point to the upper left of a company logo 340 in an image if a hot spot 350 has been specified in the upper left of the logo 340.

Figure 7:
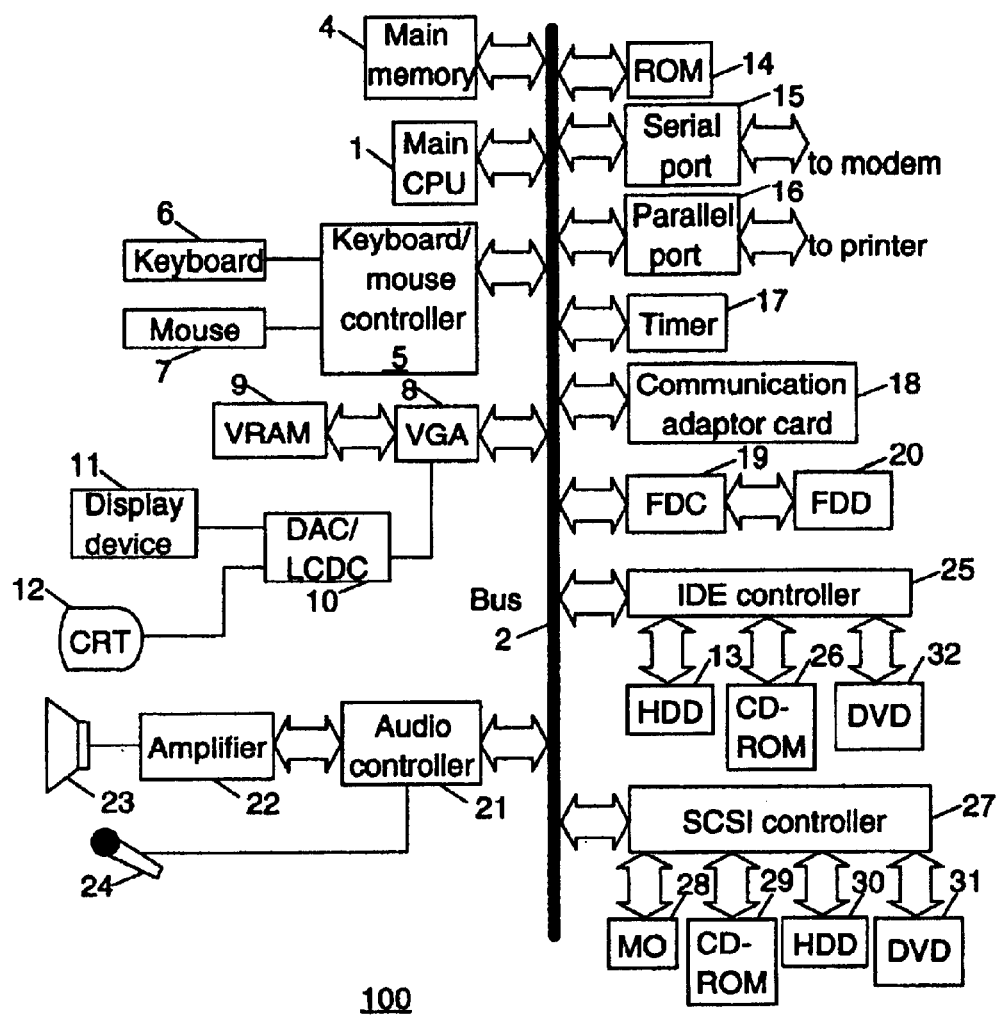
FIG. 7 illustrates an embodiment of hardware configuration of a pointing system used in the present invention.

FIG. 7 shows an embodiment of an example hardware configuration in which the pointing system used in the present invention may be practical. A system 100 comprises a central processing unit (CPU) 1 and memory 4. The CPU 1 and memory 4 are connected via a bus 2 to a hard disk drive (HDD) 13 and/or other auxiliary storage, such as storage medium drives such as a MO, a CD-ROM 26 and a DVD 32 via an IDE controller 25. Likewise, the CPU 1 and memory 4 may be connected via the bus 2 to a hard disk drive (HDD) 30 and/or other auxiliary storage, such as storage medium drives such as a MO 28, a CD-ROM 29 and a DVD 31 via a SCSI controller 27. A floppy disk drive (FDD) 20 is connected with the bus 2 via a floppy disk controller (FDC) 19. Preferably, a template database, an original image and a program related to the present invention are stored in auxiliary storage such as the hard disk drive 30.

The present invention may be embodied as code or data of a computer program for giving instructions to a CPU and so on to interact with an operating system. This code for implementing the present invention can be stored on a floppy disk (which is inserted into a floppy disk drive 20), a hard disk drive 13 (or a storage media such as MO, CD-ROM and DVD) or ROM 14, and is executed by being loaded to memory 4. This computer program code can also be compressed or divided into two or more components and stored on two or more storage media components.

The system 100 can further have user interface hardware and comprise a pointing device (a mouse, a joystick, a touch panel or the like) 7 or a keyboard 6 for entry and a display 12 for providing a user with visual data. It is also possible to connect with a printer via a parallel port 16 or connect with a modem via a serial port 15. This system 100 can be connected with a network via the serial port 15 and the modem or a communication adapter card 18 (Ethernet or Token-ring card) or the like so as to communicate with other computers and so on. It is also possible to connect an image reader (a scanner, a fax or the like) therewith via the serial port 15, the parallel port 16 or the communication adapter card 18 to obtain an original image from them. In addition, it is also possible to store a template database on a remote server and fetch a template via a communication line. Furthermore, it is possible to connect a remote transmitter-receiver with the serial port 15 or the parallel port 16 so as to exchange data by means of an infrared ray or an electric wave.

A speaker 23 receives a speech signal which is D/A (digital/analog) converted by an audio controller 21 via an amplifier 22 and outputs it as speech. In addition, audio controller 21 makes it possible to A/D (analog/digital) convert speech information received from a microphone 24 and capture into the system 100 speech information from outside the system 100.

Thus, it may be easily understood that a pointing system according to the present invention is implementable by a communication terminal with a communication facility including an ordinary personal computer (PC) or a workstation, a notebook PC, a palmtop PC, a network computer, various household electrical appliances with a built-in computer, a game console with a communication facility, a telephone, a fax, a portable telephone, a PHS, an electronic organizer or combination of these. However, these components are taken as examples, and it does not follow that all of them are required components of the present invention.

The present invention makes it possible to accurately point to any desired position of displayed components having any of a wide variety of shapes. In addition, more flexible correction can be performed to identify a coordinate position. For instance, it is possible to correct to a point with no line segment or to select a hot spot position freely, such as upper right or upper left, in addition to the vicinity of the center of a template. Furthermore, a template can be dynamically generated/changed during a pointing operation, so positioning work of a point on an image can be very easily implemented.

What is claimed is:

1. A system for pointing in a graphical user interface by using position correction information and an associated image as a template, said system comprising:

means for obtaining a coordinate in a graphical user interface from a pointing device;

means for comparing an image, in the graphical user interface, in the vicinity of the coordinate with predetermined images of templates, the templates having position correction information associated therewith;

means for locating a most matching template and its position on said image; and from the position on said image and position correction information associated with the template, means for calculating a final pointing position.

2. A system for registering a template for a graphical user interface which dynamically generates a template, said system comprising:

means for selecting an image area, from an image in a graphical user interface, to be a subject of a template;

means for storing said image area as a template image;

means for selecting a point in said image area with a pointing device; and means for storing said selected point as position correction information associated with said template image.

3. In a computing environment, a method for pointing to a position associated with an image in a graphical user interface displayed on a display by using position correction information and an associated image as a template, said method comprising the steps of:

comparing an image in a graphical user interface with template images in the vicinity of a display coordinate obtained from a pointing device, the template images having position correction information associated therewith;

locating a most matching template image and its position relative to said image; and from the position on said image and the position correction information associated with the most matching template image, calculating a final pointing position.

4. A medium which comprises a program for having pointing to a position associated with an image in a graphical user interface displayed on a display implemented by using position correction information and an associated image as a template, said program having a computer implement the functions of:

comparing an image in a graphical user interface to at least one template image in the vicinity of a display coordinate obtained from a pointing device, each of the template images having position correction information associated therewith;

locating a matching template image and its position relative to said image; and from the position on said image and the position correction information associated with the matching template image, calculating a final pointing position.

* * * * *